United States Patent [19]

Krijgsman

[11] Patent Number: 4,912,078

[45] Date of Patent: Mar. 27, 1990

[54] METHOD AND STRUCTURE FOR FORMING MAGNESIA ALUMINA SPINELS

[76] Inventor: Pieter Krijgsman, 10, Groteweg, 8191JW - Wapenveld, Netherlands

[21] Appl. No.: 208,935

[22] Filed: Jun. 20, 1988

Related U.S. Application Data

[63] Continuation-in-part of Ser. No. 887,753, Jul. 18, 1986, Pat. No. 4,753,787.

[51] Int. Cl.$^4$ .................... B01J 21/02; B01J 21/10
[52] U.S. Cl. ................................ 502/341; 502/524
[58] Field of Search ................ 502/302, 524, 341

[56] References Cited

U.S. PATENT DOCUMENTS

| | | | |
|---|---|---|---|
| 4,471,070 | 9/1984 | Siefert et al. | 502/302 |
| 4,472,532 | 9/1984 | Mool | 502/302 |
| 4,476,245 | 10/1984 | Siefert | 502/302 |
| 4,522,937 | 6/1985 | Yoo et al. | 502/524 |
| 4,728,635 | 3/1988 | Bhattaeharyya et al. | 502/524 |
| 4,753,787 | 6/1980 | Krijgsman | 423/659 |

OTHER PUBLICATIONS

P. Krijgsman, "Hydrothermal Processing of Ceramic Powders for Alumina-Magnesia Spinels", Solid State Ionics, vols. 32 and 33, Feb./Mar. 1989, pp. 436-439.
P. Krijgsman, "Hydrothermal Synthesis of Ceramic Powders for Magnesia-Alumina Based Spinels", Ceramic Eng. Sci. Proc., 9, 1988, pp. 943-948.

*Primary Examiner*—Asok Pal
*Attorney, Agent, or Firm*—Skjerven, Morrill, MacPherson, Franklin & Friel

[57] ABSTRACT

Composite powders for spinels, $MgO.nAl_2O_3$ ($n=1$ and 2), are synthesized hydrothermally using commercially available hydroxide reactants. The synthesis is carried out in an aqueous suspension within an autoclave under a pressure of 4 Mega-Pascals (MPa) and at a corresponding saturated steam temperature of 523° K. Powder characterization has shown that the particle size ranges from 2 to 10 μm. Sintering of preformed green bodies comprising compressed powder, without the use of additives, is then carried out at 1873° K. in one atmosphere, resulting in a spinel having a density 94% of theoretical. Structure and microstructure have been studied by X-ray diffraction and scanning electron microscopy, and compressive strength of the resulting spinels has been determined.

12 Claims, 4 Drawing Sheets

25 μm

FIG.5  10μm

METHOD AND STRUCTURE FOR FORMING MAGNESIA ALUMINA SPINELS

RELATED APPLICATIONS

This a continuation-in-part of a copending application, Ser. No. 06/887,753, filed July 18, 1986, entitled "Method and Structure for Forming A Reaction Product," by P. Krijgsman, now U.S. Pat. No. 4,753,787.

FIELD OF THE INVENTION

This invention relates to a method of forming magnesia-alumina spinels as a reaction product by a hydrothermal process.

DESCRIPTION OF THE PRIOR ART

Magnesia-alumina spinels ($MgO.nAl_2O_3$, $n=1$ and 2) are candidate materials for structural applications at high temperatures due, in part, to their hardness. On a laboratory scale, synthesis has been studied by solid state reaction using analytical grade oxides. There remains a need to produce magnesia-alumina based spinels on a large scale using commercially available hydroxide reactants.

In my earlier U.S. Pat. No. 4,238,240, 4,366,121 and 4,545,970, herein incorporated by reference, I describe numerous prior art structures and processes for forming reaction products. In U.S. application Ser. No. 06/887,753, incorporated by reference, I describe a novel system for forming a reaction product using a hydrothermal reaction. It will be this system which will be referred to in my preferred method to form spinel; however, it will be obvious to those skilled in the art to use any of a number of systems, such as those described in my earlier patents, to implement my novel method of forming a spinel.

SUMMARY

A hydrothermal process is disclosed herein for the production of magnesia-alumina based spinels as an alternative to solid state synthesis of spinels.

Reactants magnesium hydroxide and aluminum hydroxide are weighed and mixed separately in water and heated to form aqueous mixtures. The two mixtures are mixed together and heated for a period of time in an autoclave at a high temperature and pressure in order to achieve the desired reaction The mixture inside the autoclave is cooled, forming a slurry, and then dried. The resulting powder is pressed uni-axially into a desired shape at high pressure, then sintered under atmospheric conditions for a period of time at a high temperature to expel, as water, any remaining hydroxide and oxide-hydroxide. The resulting product is 100% spinel, $MgAl_2O_4$, with a density greater than 94% of theoretical for spinel.

BRIEF DESCRIPTION OF THE DRAWING

FIG. 5 is a scanning electron micrograph of a fracture surface of Spinel II, showing pore formation and the presence of a second phase.

DETAILED DESCRIPTION

Description of Hydrothermal System Used in Process

The hydrothermal system used to implement my inventive process is discussed in U.S. application Ser. No. 06/887,753 and herein below; however, other systems may be used to achieve identical spinel reaction products.

Hence, the following detailed description is intended to be illustrative only of one embodiment of a hydrothermal system used to implement my inventive process. The specification of my U.S. Pat. No. 4,238,240 illustrates in detail one reaction process for the formation of calcium silicate and will be referred to from time-to-time in the following description.

Figure 1:
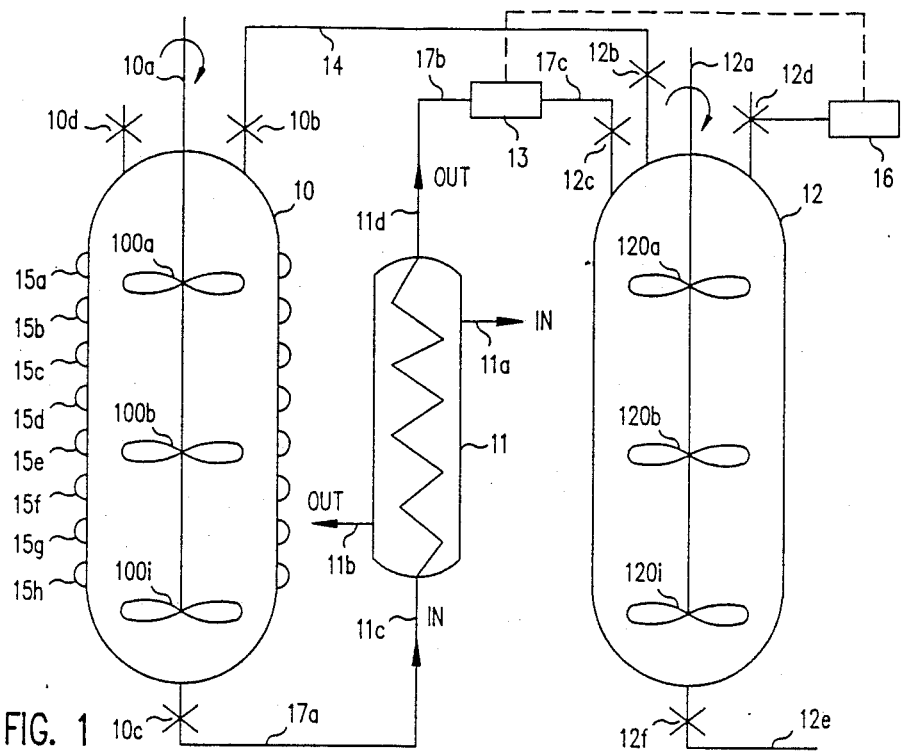
FIG. 1 illustrates an interconnected autoclave and antipressure vessel.

As will be apparent from a comparison of FIG. 1 with FIG. 1 of the '240 patent, the system discussed herein for the formation of a reaction product is substantially changed from that disclosed in the '240 patent. Thus, autoclave 10 possesses an outlet controlled by valve 10c and an inlet controlled by valve 10d both of a type well known in the art. An agitator 10a has a plurality of paddles 100a, 100b to 100i where i is an integer equal to the maximum number of paddles used with the agitator. The blades on the paddles are preferably of the INTER-MIG ® type supplied by EKATO in West Germany. In the preferred embodiment of the system six paddles are used on agitator 10a. However, a different number of paddles can be used if desired based upon experimental results. Agitator 10a is, in one embodiment, a variable speed agitator with a speed which varies from 60 rpm to 150 rpm. Of course, these speeds can also be changed if desired to achieve appropriate results depending upon the reaction products desired.

Autoclave 10 is heated by the use of a thermal oil of well known constituents. The thermal oil first is heated in a thermal oil boiler (not shown but well known in the arts) and then is pumped through hollow semicircular coils wound in a plurality of banks on the outer surface of autoclave 10. FIG. 1 shows eight cross-sections 15a through 15h of one bank of such semicircular coils. Typically, four banks of coils are used and one bank contains eight (8) spirals of heating coils which pass the thermal oil in one direction. The adjacent bank also contains eight (8) spirals of heating coils but passes thermal oil in the other direction. The use of the plurality of banks of coils minimizes the temperature drop of the heating oil in any one bank to ensure that the surface of the autoclave is reasonably uniformly heated in the steady state. In one embodiment, the temperature drop of the heating oil from the inlet to the outlet of the bank is kept to less than twenty degrees centigrade. This small temperature drop coupled with the use of the agitators allows the temperature of the reaction product in the autoclave to be kept substantially uniform within about ±1° C.

Agitator 10a within autoclave 10 is controlled to mix the reaction products within autoclave 10 to ensure substantially uniform temperature throughout the reaction products. Properly controlling the speed of agitator 10 gives substantially uniform temperature throughout autoclave 10. As a result, the crystal growth of the reaction product within autoclave 10 is also controlled to be substantially uniform.

The reaction product is formed by controlling the temperature of the reaction constituents within autoclave 10 to within a selected value for a selected value for a selected period of time at a desired pressure.

The system in FIG. 1 also includes an outlet valve 10c connected to an outlet line 17 (composed of sections 17a, 17b and 17c). Outlet line 17 passes the reaction products from autoclave 10 through heat exchanger 11. Heat exchanger 11 contains an inlet 11a and an outlet 11b to receive the heat from the reaction product flowing through line 17. As described in the '240 patent, the removal of heat from the reaction product makes available the transferred heat for further use, thereby increasing the efficiency of the process, and further stabilizes the reaction products in a desired form before the reaction products reach the antipressure vessel 12.

The reaction products flowing through pipe 17 pass into heat exchanger 11 at inlet 11c and out from heat exchanger 11 through outlet 11d. From outlet 11d the reaction products flow through pipe 17b, flow meter 13 (preferably a magnetic flow meter), pipe 17c and inlet valve 12c into receiving vessel 12. Vessel 12 likewise contains an agitator 12a containing a plurality of paddles 120a, 120b, ... through 120i, where i is likewise an integer representing the number of paddles on agitator 12a. The blades of paddles 120 are also preferably the INTERMIG ® type from EKATO in West Germany. One embodiment of this system uses six (6) such paddles although again the number of paddles used can be determined empirically depending upon the quality desired for the resulting product. Vessel 12 has an outlet 12e with a valve 12f for controlling the removal of material from vessel 12. In addition, a vent 12d is provided. Vent 12d includes a pressure release valve (preferably a digital valve) which is electronically coupled to flow meter 13 in such a way as to maintain substantially constant the volumetric flow of material from autoclave 10 into vessel 12. This ensures that the steam from autoclave 10 which was previously placed in vessel 12 prior to the start of the transfer of the reaction products from autoclave 10 to vessel 12 is released from vessel 12 at the same volumetric rate as the reaction products entering vessel 12 from autoclave 10.

Prior to the transfer of reaction products from autoclave 10 to vessel 12, steam from autoclave 10 is bled from autoclave 10 into vessel 12 by opening valves 10b and 12b on line 14 connecting autoclave 10 to vessel 12 until the pressure in vessel 12 equals the pressure in autoclave 10. As soon as the pressures are equal in vessel 12 and autoclave 10, valves 10b and 12b are closed and valves 10c and 12c are opened. Because vessel 12 has not been heated by thermal fluid as has autoclave 10, the natural transfer of heat from the steam within vessel 12 to the walls of vessel 12 cools down the steam and lowers the pressure within vessel 12, thereby starting the transfer of the reaction products from autoclave 10 to vessel 12.

As soon as the flow of the reaction product from autoclave 10 to vessel 12 starts, valve 12d (preferably a digital valve) is opened to a selected value to maintain the flow, as detected by magnetic flow meter 13, at a selected value Alternatively, valve 12d can be opened to lower the pressure in vessel 12 and start the transfer of the reaction products from autoclave 10 to vessel 12. Flow meter 13 measure volumetric flow rate. Of course, a mass flow meter can be used if desired. Flow meter 13 produces an electrical output signal representative of the volumetric flow rate of the reaction product from autoclave 10 to vessel 12. This electrical output signal is transmitted to control 16 of a well-known design which in turn produces a digital output signal which controls the setting of digital valve 12d. Should the flow rate of reaction products through flow meter 13 be beneath the desired value, valve 12d is opened to decrease the pressure in receiving vessel 12 by allowing steam within that vessel to vent to the atmosphere. Should the flow rate of reaction products through magnetic flow meter 13 be higher than desired, control 16 closes down valve 12d to reduce the amount of steam allowed to escape from vessel 12, thereby to properly control the flow rate of reaction products through magnetic flow meter 13 to the desired value. Flow meter 13 typically has an accuracy of about plus or minus 1% over its whole range and, thus, the flow of reaction products through pipe 15 can be controlled within this accuracy using a negative feedback control system. In this system the output signal from the flow meter 13 is compared to a reference signal representative of the desired volumetric flow rate of the reaction products from autoclave 10 to vessel 12 and the difference between these two signals, expressed as a digital signal, is used to control the setting of valve 12d. While the volumetric flow rate is controlled in the preferred embodiment, mass flow rate could, if desired, be controlled. As part of the control system, the instantaneous pressures in autoclave 10 and vessel 12 are measured using sputtered film pressure transducers of a type made available by CEC Corporation in Pasadena, Calif. These transducers are linear and reproduceable over a range of pressures typically up to several hundred atmospheres and retain their accuracy over their lifetime.

Figure 2:
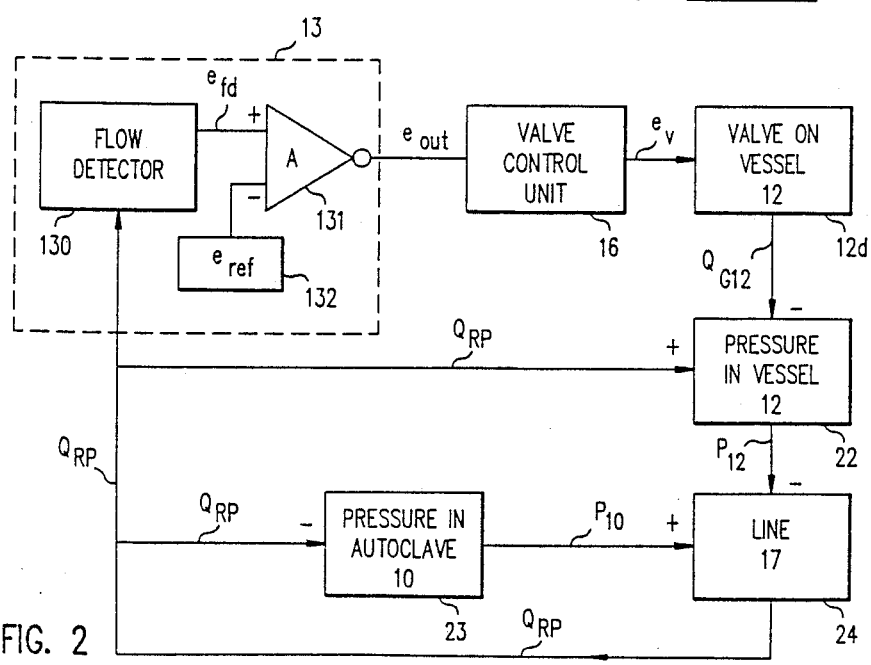
FIG. 2 illustrates schematically the control system used in the system of FIG. 1.

FIG. 2 illustrates schematically the control system of this system. Magnetic flow meter 13 comprises several components. Flow detector 130 actually detects the volumetric flow $Q_{RP}$ of reaction products from autoclave 10 to vessel 12 and produces an electrical output signal $e_{fd}$ which is transmitted to the noninverting input lead of a differential amplifier 131. A reference voltage $e_{ref}$ from a reference voltage source 132 is applied to the inverting input of amplifier 132. The output voltage $e_{out}$ from differential amplifier 131 represents the difference in the output signal $e_{fd}$ from the flow detector 130 and the output signal $e_{ref}$ from the reference source 132. This output voltage $e_{out}$ is transmitted to valve control unit 16 which generates a digital output signal $e_v$ (which comprises six bits transmitted to digital valve 12d preferably in parallel on a six channel bus) which controls digital valve 12d mounted on vessel 12 (see FIG. 1). Digital valve 12d is selected because it is highly linear and does not exhibit significant hysteresis. Moreover, digital valve 12d can be adjusted very rapidly to any one of 64 possible different settings within milliseconds. Typically, digital valve 12d has 6 ports each sized differently to handle a different flow. The combination of all 6 ports open gives the maximum flow through the valve whereas leaving open only the smallest port gives the smallest flow. Each port is controlled by its own magnetic coil and thus the valve can be driven to any one of $2^6$ or 64 linearly related positions extremely rapidly.

The output from valve 12d is the flow rate of gas $Q_{G12}$ from vessel 12. This flow rate reduces the pressure in vessel 12 as shown in FIG. 2 by the negative sign on the input of the arrow from valve 12d to the block 22 labeled "pressure in vessel 12." The pressure in vessel 12 is also increased by the flow of reaction products from autoclave 10 into vessel 12 as illustrated by the plus sign on the arrow associated with the line relating to the flow rate $Q_{RP}$ of the reaction products from the autoclave 10. The pressure in vessel 12 generally restrains the flow of reaction products from autoclave 10 to vessel 12 and thus the output from the block 22 labeled "pressure in vessel 12" is shown as P12 and given a negative sign as an input to line 17. This indicates that this pressure acts as a back pressure on the flow of reaction products through line 17. On the other hand, the pressure $P_{10}$ in vessel 20 drives the reaction products from autoclave 10 to vessel 12 and thus is shown as a positive influence on line 17. The output from box 24 labeled line 17 is the flow rate of reaction product $Q_{RP}$ from autoclave 10 to vessel 12. The flow of reaction products from autoclave 10 decreases the pressure in autoclave 10 and this is shown by the negative arrow labeled $Q_{RP}$ pointing to block 23. The flow detector 130 detects the flow rate $Q_{RP}$ of the reaction products from the autoclave 10 to vessel 12 and produces the output signal $e_{out}$ representing this flow.

In operation, should the flow drop beneath the desired flow rate indicated by $e_{ref}$, $e_{fd}$ drops beneath $e_{ref}$ and the output signal $e_{out}$ becomes positive thereby driving valve control unit 16 to open valve 12d. Opening valve 12d increases $Q_{G12}$ thereby dropping further the pressure $P_{12}$ in vessel 12. This increases $Q_{RP}$. Increasing $Q_{RP}$ drops further the pressure $P_{10}$ in autoclave 10 and increases the pressure $P_{12}$ in vessel 12. However the flow $Q_{H12}$ is properly selected to increase $Q_{RP}$ to the desired value. On the other hand, should $e_{fd}$ be larger than $e_{ref}$, $e_{out}$ is negative and thus reduces the voltage $e_v$ used to control the setting of valve 12d thereby decreasing $Q_{G12}$ and increasing slightly the pressure $P_{12}$ in vessel 12 over its nominal value for that time. This slows down the flow of reaction products from autoclave 10 to vessel 12 thus decreasing $Q_{RP}$.

In the preferred embodiment of the system, the reaction product is transferred through pipe 17 under laminar flow conditions thereby preventing the crystal structure formed in autoclave 10 from degrading. For safety's sake, the same pressure transducers placed on the top of autoclave 10 and vessel 12 are also connected to safety control circuits to prevent the inadvertent opening by individuals operating the system of any valves during the reaction process. In addition, safety valves are placed on the top of autoclave 10 and vessel 12 to relieve pressures within these vessels should these pressures exceed safety limits.

The process and structures described above are multipurpose in the sense that the process and structure can be used to provide a number of different reaction products. The process is especially suited for the production of new, higher resistance insulation materials such as composites formed of magnesium, zirconium, and titanium among other materials. In addition, the process can be used to produce ceramic powders such as silicon carbide, silicon nitride, titanium diboride, and spinels by means of hydrothermal reactions. This is made possible by the ability to use high temperatures and pressures in the above-described system and multipurpose reaction process.

The use of a hydrothermal reaction to form ceramic powders saves a substantial amount of energy over standard methods for the formation of such ceramic powders. Moreover, the hydrothermal reaction provides ceramic material of substantially uniform crystal size in a powder like form. A typical prior art process for forming such powders involves melting ingredients at a very high temperature (2800° C.–3000° C.), allowing the melted ingredients to cool in a large block to ambient temperatures, crushing the block into smaller parts, coarsely grinding the smaller parts to yield rough crystals, and then finely grinding the rough crystals to yield fine powders. By using my multipurpose process to form reaction products, described above, this energy intensive process is totally avoided. My hydrothermal process will produce directly fine crystal powder. The hydrothermal reaction takes place at a temperature in the 300° C. range rather than at several thousand degrees centigrade. By controlling the time of reaction, the size of the ceramic crystals can be fairly accurately controlled to the desired dimension. Thus, the general hydrothermal process described above yields a substantial improvement in the formation of uniform crystals of reaction products over the prior art, both in terms of energy consumed and the uniformity of the resulting structure.

In addition, the prior art grinding procedure yields crystals of nonuniform and differing sizes even though the resulting materials are substantially fine. This creates certain problems in using these crystals to form finished products. In particular, ceramic materials are known to be brittle despite their other desirable characteristics. Because of this shortcoming, ceramic materials find fewer applications in advanced technology than justified by their potential benefits. Thus, research is being done to increase the lifetime and prolong the fatigue limits of ceramic materials such that ceramic materials can be used in new applications to replace a variety of metal composites. However, nonuniformity of ceramic crystal size yields a nonuniform bonding force which in itself relates to discrepancies in the atomic structure of the ceramic crystal making up the ceramic materials. Scanning electron microscope (SEM) exposures of ceramic materials show that fatigue starts at those places where there are substantial differences in uniformity of the ceramic crystals. Apparently the bonding energy between nonuniform crystals is unable to find a so-called harmonic neighbor thus leading to spontaneous fatigue because of the differences in the bonding energy between different size crystals within the material. At this stage of the technological development of materials from ceramic crystals, several companies have acquired improved crystal size uniformity obtained using a grinding process but still the uniformity is not sufficient to allow the proven material to be used in high technology applications such as blades for jet engines. Thus, considering these factors, my multipurpose process for forming reaction products, described above, makes possible the fabrication of a substantially uniform powder.

By using the system of FIGS. 1 and 2 to implement my inventive process for forming spinels the following is enabled:

1. Controlled temperature of the reaction process within plus or minus about one (1) degree Kelvin;
2. Control of pressure by use of pressure transducers such as sputtered film transducers of a type made available by CEC Corporation in Pasadena, Calif.;
3. Variable speed stirring equipment using INTERMIG ® blades of a type provided by EKATO in West Germany;
4. Reproduceability of reaction products as a function of reaction time and temperature;
5. Use of less energy than prior art processes; and 6. The attaining of higher precalculable solubility for reaction constituents to allow accurate characterization of the process.

Description of Process to Form Spinel

My inventive process for forming magnesia-alumina spinels ($MgO.Al_2O_3$, n=1 and 2) using the system of FIGS. 1 and 2 will now be described.

In one embodiment of my inventive process for the hydrothermal synthesis of magnesia-alumina composites, two series of batches are prepared for comparison using magnesium hydroxide, 99% type C from Dead Sea Periclase (Israel) and aluminum hydroxide, 99%, SH 100 from Sochalu (France). The first series of batches, denoted Spinel I, contain equimolar quantities of both hydroxides for forming $MgO.Al_2O_3$; the second series of batches, denoted Spinel II, contain a double amount of aluminum hydroxide for forming $MgO.2Al_2O_3$. The reactants in each batch are weighed and mixed separately in water for approximately 15 minutes at approximately 333° K. to form aqueous mixtures. In one embodiment, 50 Kg of water is mixed with 1 Kg of reactant to form each aqueous mixture. Subsequently, the two aqueous mixtures are fed into autoclave 10 of FIG. 1. The combined aqueous mixtures are stirred continuously in autoclave 10 by agitator 10a and heated by means of thermal oil circulated through coils 15a through 15h to achieve a saturated steam temperature of approximately 523° K. within autoclave 10 with a corresponding pressure within autoclave 10 of 4 Mega Pascals (MPa). At this temperature and pressure, the reaction time is approximately four hours. Upon reaching the desired reaction time, the products are transferred through heat exchanger 11 into receiving vessel 12 under controlled laminar conditions by creating a small difference in pressure between autoclave 10 and receiving vessel 12. Damage of the product crystals is therefore avoided.

The hydrothermally treated slurries now contained within receiving vessel 12 are then fed into a laboratory spray dryer. The resulting powders are virtually dry (in an actual run, 0.6% was the highest recorded residual moisture content). The powder is then pressed uni-axially in a die at a pressure of 13.5 MPa to a desired shape. In one embodiment, approximately 2 grams of the powder harvested from the spray dryer were pressed into a pellet, and green, or intermediate, densities of about 55% of the theoretical were achieved without the use of any binder.

The resulting pellets are then sintered under atmospheric conditions for approximately two hours at approximately 1873° K. to decompose hydroxide and oxide-hydroxide and expel these constituents in the form of water Both heat-up and cooling-down increments should be approximately 5° K./min. During sintering, a weight loss of about 24% occurs consistent with the formation of water out of the decomposition of the hydroxide and oxide-hydroxide.

Figure 3:
FIG. 3 is a scanning electron micrograph of Spinel I, showing one type of crystals with uniform size.

In actual resulting powders, before sintering, X-ray diffraction showed that the hydrothermally treated powders consist of boehmite (AlOOH) and magnesium hydroxide ($Mg(OH)_2$) Hence, no spinel has been formed during the hydrothermal treatment before sintering probably due to problems with the solubility of the reactants. Although the X-ray diffraction pattern showed two compounds, in the SEM micrograph of FIG. 3 only one type of crystal can be observed. This indicates that during the hydrothermal treatment, a coprecipitation of the two compounds occurs. The rather broad lines of boehmite observed in the X-ray diffraction pattern suggest that boehmite is incorporated in the crystals in the form of very fine particles. More than 80% of the particles harvested from the spray dryer had sizes between 2 and 10 $\mu$m. This is an extreme narrow distribution and a relatively small grain size, which is beneficial for sintering behavior. The particle size distribution was determined by means of a laser beam operated Fraunhofer diffraction analyzer by Sympatec, Type Helos. The results of the hydrothermal treatment of Spinel I are similar to those of Spinel II.

X-ray diffraction of the sintered pellets, however, showed that for Spinel I the boehmite-magnesium hydroxide mixture was completely transformed to spinel ($MgAl_2O_4$) and for Spinel II the mixture was transformed to spinel and alumina $Al_2O_3$, where an excess of boehmite was present. The interplanar spacings of spinel in Spinel II are somewhat smaller than in Spinel I, suggesting that some alumina has dissolved in spinel.

Figure 4:
FIG. 4 is a scanning electron micrograph of a fracture surface of Spinel I, showing the absence of pores or a second phase.

A volume contraction of 74% due to sintering resulted in densities greater than 94% of theoretical for Spinel I, with no sinter additives having been used. The extent of densification is illustrated by the micrograph of the fractured surface of Spinel I in FIG. 4. Only a few pores are left. Spinel II does not shown such a great densification, as illustrated in FIG. 5. In FIG. 5, we clearly see a second phase present (alumina). It should be noted here, that this densification is accomplished in a single, short sinter procedure, which is very simple compared to the process necessary if other reactants are used. This is probably due to the very intimate mixture existing in the hydrothermally treated powders, since a common mixture of boehmite and magnesium hydroxide does not reach such high densities in the same procedure.

The sintered pellets obtained using the process described above were exposed to destructive testing on a laboratory Instron, model 1000 with a maximum load of 5 KN. Since the physiognomy of the pellets concerned is of a tablet form, with spherical ends, loads will always be applied in the form of point contact loads. Because of the very small area involved, contact stresses for even small loads are very high. The point load (N) upon collapse of the pellets was recorded and used in the well-known Herz equation to calculate the compressive strength. The static tests were carried out at 300° K. and the results are presented in Table 1. These results indicate that the pellets have reproduceable properties. Furthermore the presence of an excess of alumina in Spinel II seems to weaken the samples. The values of the compressive strength of both Spinel I and II are much larger than given by Gray in the article "High Temperature Oxides", part IV, Academic Press, N.Y., 1971, which is 130 MPa. The small grain sizes in the sintered pellets might be responsible for this.

TABLE 1

| Data on the destructive testing of Spinel I and Spinel II. | | | |
|---|---|---|---|
| | | load in N | compressive strength MPa |
| Spinel I | sample 1 | 86.9 | 609.5 |
| | sample 2 | 86.4 | 608.3 |
| | sample 3 | 87.4 | 610.6 |
| Spinel II | sample 1 | 76.6 | 584.3 |
| | sample 2 | 76.6 | 584.3 |
| | sample 3 | 78.6 | 589.3 |

Hence, my inventive hydrothermal treatment of commercially available hydroxides yields highly interactive magnesia-alumina spinel precursors, whereupon sintering of the magnesia-alumina spinel precursors leads to the formation of spinel with a density larger than 94% of theoretical, without the use of sinter additives. The resulting spinel exhibits a compressive strength shown to be at least a factor of four better than published data.

It will be obvious to those skilled in the art to modify for various reasons the preferred embodiment of my process for forming a spinel such as by increasing temperatures, pressures, and reaction times; however, the inventive concept behind my process, as claimed, is intended to encompass these modifications. For example, the saturated steam temperature within autoclave 10 may range between 591° K., corresponding to a pressure of 11 MPa, and 486° K., corresponding to a pressure of 2 MPa, and spinel will still be formed in accordance with this invention; however, a reaction within autoclave 10 under higher temperatures/pressures will desireably occur faster and be more homogeneous.

What is claimed is:

1. A method of forming spinel comprising the steps of:
   mixing first reaction constituent magnesium hydroxide in water to form a first aqueous mixture;
   mixing second reaction constituent aluminum hydroxide in water to form a second aqueous mixture;
   combining said first and second aqueous mixtures in an autoclave to form a third aqueous mixture and stirring said third aqueous mixture continuously;
   heating said third aqueous mixture to a selected temperature and pressure for a time selected to allow the formation of a reaction product comprising bohemite and magnesium hydroxide particles within a selected particle size range;
   cooling and drying said third aqueous mixture to form a powder;
   compressing grains of said powder together into a desired form under high pressure; and
   sintering said compressed grains to remove hydroxide and oxide-hydroxide and to densify the resulting spinel.

2. The method of claim 1 wherein said step of heating said third aqueous mixture comprises heating said third aqueous mixture in said autoclave to generate a saturated steam temperature within said autoclave between 486° K. and 591° K., and generating corresponding pressures within said autoclave of between approximately 2 MPa and 11 MPa, respectively.

3. The method of claim 1 wherein said step of heating said third aqueous mixture comprises heating said third aqueous mixture in said autoclave to generate a saturated steam temperature within said autoclave of approximately 523° K., and generating a corresponding pressure within said autoclave of 4 MPa.

4. The method of claim 3 wherein said step of heating further comprises heating said third aqueous mixture for approximately four hours after said steam temperature equals approximately 523° K.

5. The method of claim 1 wherein said step of compressing grains of said powder comprises compressing grains of said powder under a pressure of approximately 3.5 MPa with uniaxial pressure.

6. The method of claim 1 wherein said step of sintering comprises sintering said compressed grains of said powder under atmospheric conditions for approximately two hours at approximately 1873° K.

7. The method of claim 1 wherein said step of cooling said third aqueous mixture comprises transferring said third aqueous mixture from said autoclave into a receiving vessel via a heat exchanger means.

8. The method of claim 1 wherein said step of mixing magnesium hydroxide in water comprises mixing said magnesium hydroxide in water for approximately fifteen minutes at approximately 330° K.

9. The method of claim 7 wherein said step of mixing aluminum hydroxide in water comprises mixing aluminum hydroxide in water for approximately fifteen minutes at approximately 330° K.

10. The method of claim 8 wherein said step of mixing said magnesium hydroxide in water and said step of mixing aluminum hydroxide in water comprises mixing approximately 50 Kg of water with approximately 1 Kg of reactant magnesium hydroxide or aluminum hydroxide.

11. The method of claim 8 wherein said magnesium hydroxide and said aluminum hydroxide are in equimolar quantities.

12. The method of claim 8 wherein the molar quantity of said aluminum hydroxide is twice that of said magnesium hydroxide so that said resulting spinel is $MgO.2Al_2O_3$.

* * * * *

UNITED STATES PATENT AND TRADEMARK OFFICE
CERTIFICATE OF CORRECTION

PATENT NO.   :   4,912,078
DATED        :   March 27, 1990
INVENTOR(S)  :   Pieter Krijgsman It is certified that error appears in the above-identified patent and that said Letters Patent is hereby corrected as shown below:

column 7, line 7, change "Mgo.Al$_2$O$_3$" to --MgO.nAl$_2$O$_3$--.

column 8, line 26, change "shown" to --show--.

COL. 10; Correct Claim 12 to read:

--12. The method of Claim 8 wherein the molar quantity of said aluminum hydrozide is twice that of said magnesium hydroxide so that [said resulting spinel is MgO.2Al$_2$O$_3$] spinel (MgAl$_2$O$_4$) and alumina (Al$_2$O$_3$) are produced.

Add Claim 13 as follows:

--13. The method of Claim 1 wherein said magnesium hydroxide and said aluminum hydroxide are in equimolar quantities so that only spinel (MgAl$_2$O$_4$) is produced.

UNITED STATES PATENT AND TRADEMARK OFFICE
CERTIFICATE OF CORRECTION

PATENT NO.  :  4,912,078
DATED       :  March 27, 1990
INVENTOR(S) :  Pieter Krijgsman It is certified that error appears in the above-identified patent and that said Letters Patent is hereby corrected as shown below:

Add Claim 14 as follows:

--14. The method of Claim 1 wherein the molar quantity of said aluminum hydroxide is twice that of said magnesium hydroxide so that spinel ($MgAl_2O_4$) and alumina ($Al_2O_3$) are produced.

Signed and Sealed this

Twelfth Day of January, 1993

*Attest:*

DOUGLAS B. COMER

*Attesting Officer*     Acting Commissioner of Patents and Trademarks